US011023337B2

(12) United States Patent
Shinozaki et al.

(10) Patent No.: US 11,023,337 B2
(45) Date of Patent: Jun. 1, 2021

(54) INFORMATION PROCESSING SYSTEM AND CONTROL APPARATUS

(71) Applicant: FUJITSU LIMITED, Kawasaki (JP)

(72) Inventors: Tatsuya Shinozaki, Kawasaki (JP); Takanori Ishii, Nerima (JP); Keisuke Yamasaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 189 days.

(21) Appl. No.: 16/122,933

(22) Filed: Sep. 6, 2018

(65) Prior Publication Data

US 2019/0079838 A1 Mar. 14, 2019

(30) Foreign Application Priority Data

Sep. 11, 2017 (JP) .............................. JP2017-173762

(51) Int. Cl.
*G06F 11/00* (2006.01)
*G06F 11/20* (2006.01)
*H04L 29/08* (2006.01)

(52) U.S. Cl.
CPC ...... *G06F 11/2023* (2013.01); *G06F 11/2089* (2013.01); *H04L 67/1097* (2013.01); *G06F 2201/805* (2013.01); *G06F 2201/82* (2013.01)

(58) Field of Classification Search
CPC ...... G06F 11/0709; G06F 11/00; G06F 11/07; G06F 11/142; G06F 11/1423;
(Continued)

(56) References Cited

U.S. PATENT DOCUMENTS

2002/0062455 A1* 5/2002 Lee ..................... G06F 1/3203
713/323
2005/0198243 A1* 9/2005 Snible ................ H04L 12/6418
709/223
(Continued)

FOREIGN PATENT DOCUMENTS

| JP | 2002-007227 | 1/2002 |
| JP | 2011-76528  | 4/2011 |
| JP | 2015-55878  | 3/2015 |

OTHER PUBLICATIONS

JPOA—Japanese Office Action dated Apr. 13, 2021 for corresponding Japanese Patent Application No. 2017-173762, with English translation (7 pages).

*Primary Examiner* — Sarai E Butler
(74) *Attorney, Agent, or Firm* — Fujitsu Patent Center (57) ABSTRACT

An information processing system includes a plurality of control apparatuses communicably coupled to each other. A first control apparatus of the plurality of control apparatuses includes a first memory configured to store first instructions and a first processor configured to operate using standby power before a power-on selection is made. The first processor executes the first instructions causing a process including collecting first identification information of each of the plurality of control apparatuses other than the first control apparatus. The process includes storing the first identification information in the first memory. The process includes determining a role of the first control apparatus based on a comparison result derived by comparing second identification information of the first control apparatus with the first identification information.

13 Claims, 6 Drawing Sheets

(58) Field of Classification Search
CPC ...... G06F 11/1425; G06F 11/16; G06F 11/20; G06F 11/2005; G06F 11/2007; G06F 11/202; G06F 11/2023; G06F 11/2092
USPC ................................................ 714/4.1, 1–57
See application file for complete search history.

(56) References Cited

U.S. PATENT DOCUMENTS

| | | | |
|---|---|---|---|
| 2012/0042199 A1* | 2/2012 | Chavez | H04L 67/04 714/4.21 |
| 2012/0173953 A1* | 7/2012 | Flynn | G06F 11/1004 714/758 |
| 2015/0143160 A1* | 5/2015 | Diederich | H04L 69/40 714/4.11 |
| 2015/0311749 A1* | 10/2015 | Frampton | H02J 9/066 307/65 |
| 2015/0370691 A1* | 12/2015 | Pandey | G06F 11/3672 714/38.1 |

* cited by examiner

INFORMATION PROCESSING SYSTEM AND CONTROL APPARATUS

CROSS-REFERENCE TO RELATED APPLICATION

This application is based upon and claims the benefit of priority of the prior Japanese Patent Application No. 2017-173762, filed on Sep. 11, 2017, the entire contents of which are incorporated herein by reference.

FIELD

The embodiment discussed herein is related to an information processing system and a control apparatus.

BACKGROUND

In a scale-out storage system, in order to improve performance and capacity, for example, scale out is implemented by adding a control enclosure (CE) in which two controller modules (CMs) are contained.

Figure 6:
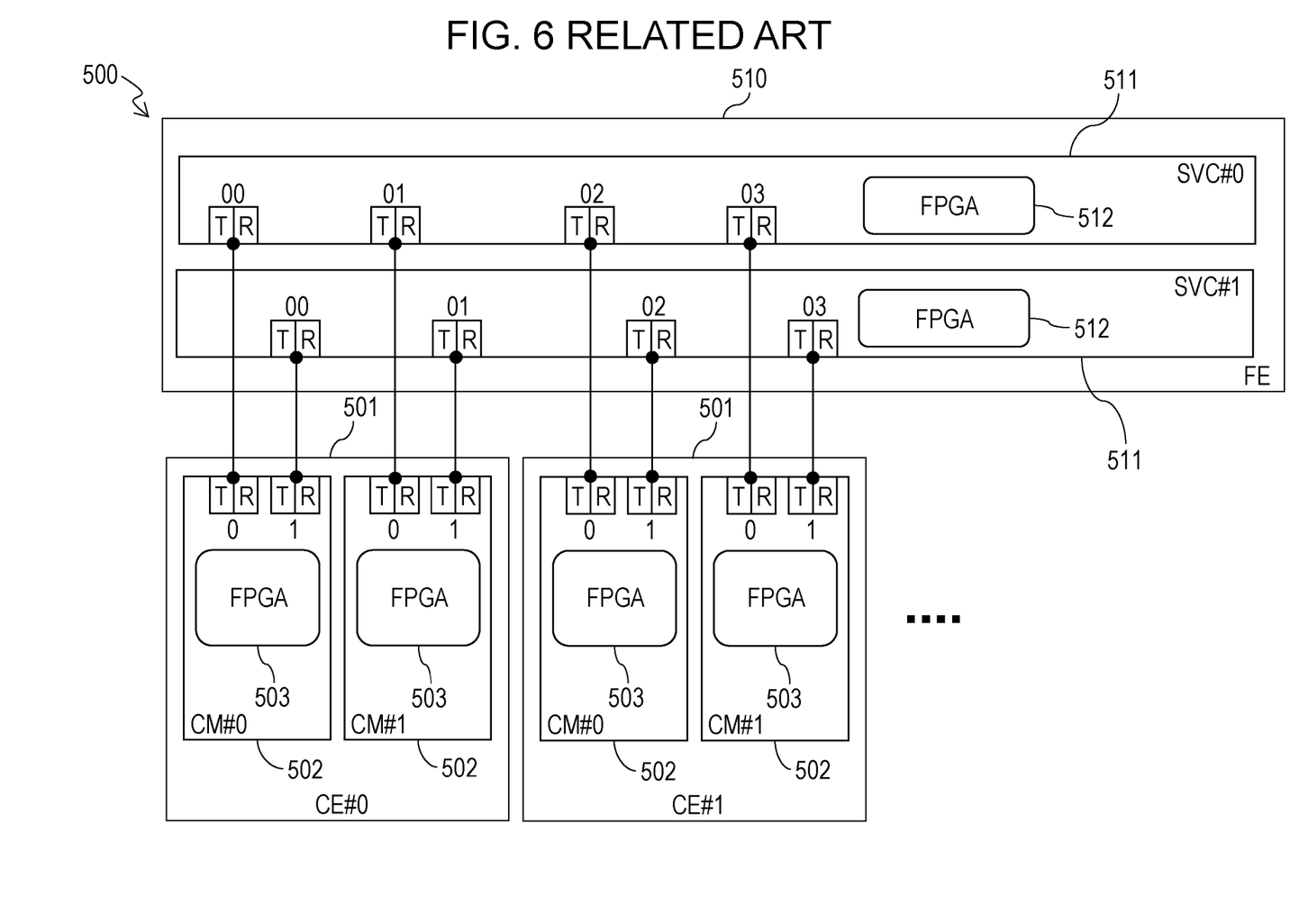
FIG. 6 is a diagram illustrating a configuration of an existing scale-out storage system.

FIG. 6 is a diagram illustrating a configuration of an existing scale-out storage system 500.

The storage system 500 illustrated in FIG. 6 includes a front end controller (FE) 510 and two or more CEs 501.

The FE 510 is a coupling device for coupling a plurality of CMs 502 and, in the example illustrated in FIG. 6, implements a redundant configuration by containing two service controllers (SVCs) 511 inside the enclosure (not illustrated) thereof.

The SVC 511 is a monitor device that performs various types of monitoring in the storage system 500. For example, the SVC 511 communicates with each CM 502 to collect error state information and store error logs.

The SVC 511 includes a field programmable gate array (FPGA) 512 for achieving a communication control function. The FPGA 512 communicates (inter-FPGA communication) with an FPGA 503 of the CM 502 via a communication cable (management path).

Each CM 502 communicates with any other CM 502 via the SVC 511. All of communications related to management functions across the CEs 501 are performed through the SVCs 511.

Each CE 501 contains two CMs 502 inside the enclosure (not illustrated) thereof.

The CM 502 performs various types of control in the storage system 500 and performs, in accordance with a storage access request from a host device (not illustrated), various types of control such as controlling access to a hard disk drive (HDD) (not illustrated) or another storage device. All of the CMs 502 has configurations similar to each other.

Each CM 502 includes the FPGA 503 for achieving a communication control function. The FPGA 503 performs inter-FPGA communication with the FPGA 512 of the SVC 511 described later via a communication cable.

The storage system 500 has a redundant configuration including a plurality of CMs 502. Even when the CM 502 (for example, CM #0) serving as the master has entered an abnormal state, the storage system 500 may operate without interruption by using the CM 502 (for example, CM #1) serving as a slave.

Among the plurality of CMs 502, the CM 502 (hereinafter sometimes referred to as a master CM) that serves as the master achieves management functions such as state monitoring, power supply control, and log functions.

The management functions include, as functions to control each CM 502, for example, control of turning on and off and resetting the power supply of each CM 502, control of turning on and off a light emitting diode (LED), and the like. The management functions also include a function of extracting logs of each CM 502 and include a routing function and an arbitration function of communication via a route passing between CMs and an SVC for performing inter-CM communication. Note that the arbitration function is a function of arbitrating which device is given priority over the others when communication is performed via a bus.

When the storage system 500 is scaled out, it is desired that these management functions be operated together by a plurality of CMs 502.

In the storage system 500 including SVCs 511 as illustrated in FIG. 6, when the master CM 502 has entered an abnormal state, the SVC 511 selects one CM 502 from the plurality of slave CMs 502 and performs control so as to cause the selected CM 502 to function as a new master CM 502.

In addition, as a storage system, a storage system in a small-scale configuration including a few CMs is also used.

In such a storage system in a small-scale configuration, the system is made up of a plurality of CMs coupled to each other via a communication line, without including the FE 510 (the SVC 511).

In such a storage system in a small-scale configuration with a few CMs, the management functions performed by the SVC 511 in the storage system 500 in FIG. 6 are performed on a CM that functions as the master. That is, with a CM recognized as the master CM among a plurality of CMs, the management functions are caused to operate to achieve inter-enclosure management functions.

Note that the management functions include functions to control each CM as mentioned above. Accordingly, at power-on of the storage system, in each CM, at the time when only the FPGA has been activated and the activation of the CM itself is not yet complete, it is to be determined whether the CM will be activated as either the master or a slave.

In the event that an abnormality is detected in the master CM, the functions of the master CM are taken over by a slave CM. That is, a CM that will serve as the master is selected from the remaining CMs and the selected CM will operate as a new master CM.

Related techniques are disclosed in, for example, Japanese Laid-open Patent Publication No. 2015-55878 and Japanese Laid-open Patent Publication No. 2011-76528.

However, in the scale-out storage without inclusion of an SVC, each CM is capable of becoming either the master or a slave, and therefore if each CM is defined in a fixed manner in advance as the master or a slave, it may lead to an undesirable lack of versatility.

SUMMARY

According to an aspect of the present invention, provided is an information processing system including a plurality of control apparatuses communicably coupled to each other. A first control apparatus of the plurality of control apparatuses includes a first memory configured to store first instructions and a first processor configured to operate using standby power before a power-on selection is made. The first processor executes the first instructions causing a process including collecting first identification information of each of the plurality of control apparatuses other than the first control apparatus. The process includes storing the first identification information in the first memory. The process includes determining a role of the first control apparatus based on a comparison result derived by comparing second identification information of the first control apparatus with the first identification information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, an embodiment will be described with reference to the accompanying drawings. Each of the drawings does not purport merely to include the elements illustrated therein but may include other functions and the like.

(A) Configuration

Figure 1:
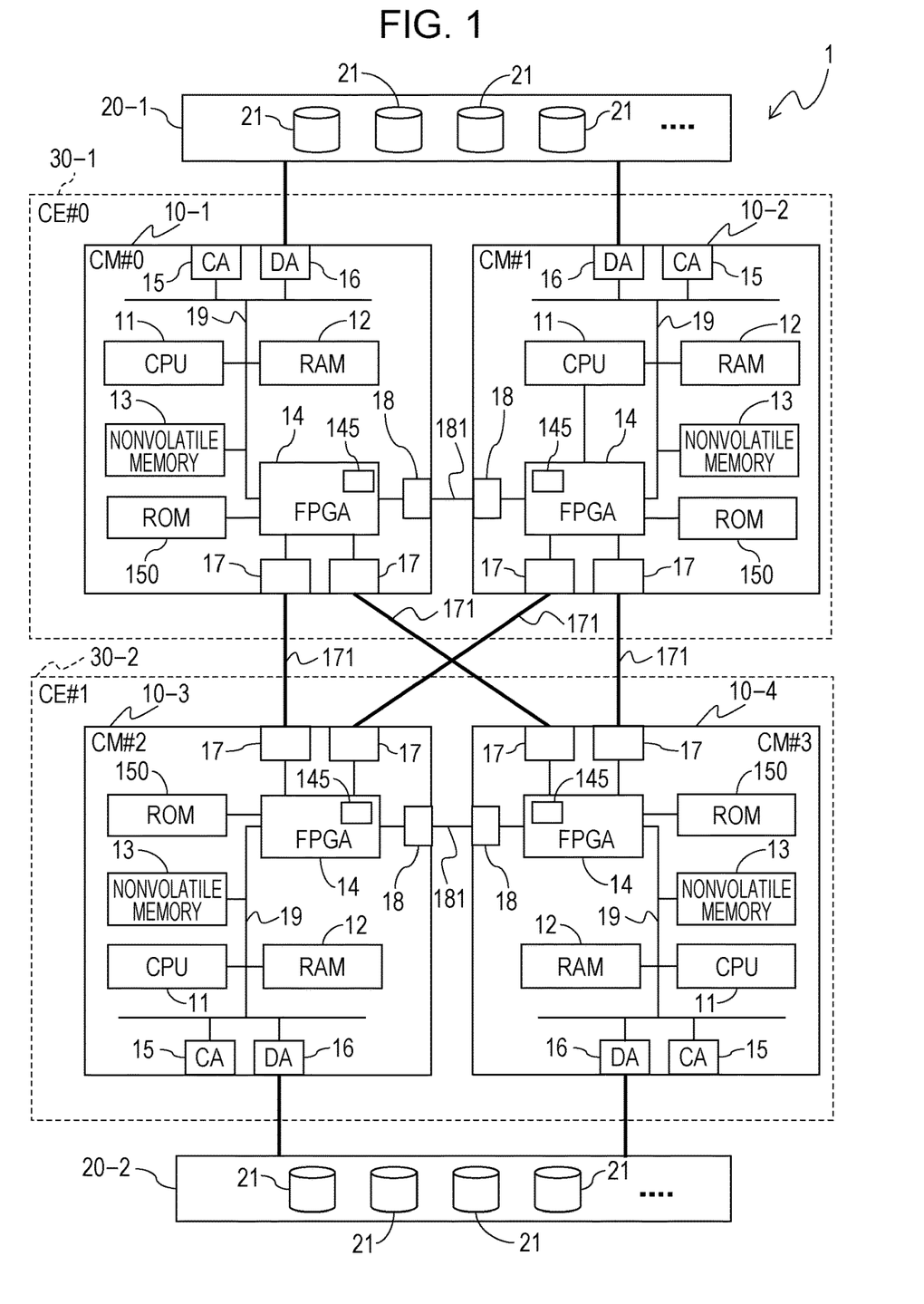
FIG. 1 is a diagram illustrating an example of a hardware configuration of a storage system according to an embodiment.

First, with reference to FIG. 1, a hardware configuration of a storage system 1 according to an embodiment will be described. Note that FIG. 1 is a diagram illustrating an example of a hardware configuration of the storage system 1 including storage control apparatuses 10-1 to 10-4 in the present embodiment.

The storage system 1 virtualizes storage devices 21 housed in drive enclosures (DEs) 20-1 and 20-2 to form a virtual storage environment. The storage system 1 provides a virtual volume to a host device (server) (not illustrated) that is an upper device.

The storage system 1 is communicatively coupled to one or more host devices. The host devices and the storage system 1 are coupled to each other by using communication adapters (CAs) 15 described later.

The host device is, for example, an information processing apparatus with the functionality of a server and transmits and receives commands for a network attached storage (NAS) and a storage area network (SAN) to and from the storage system 1. The host device, for example, writes or reads data to or from a volume provided by the storage system 1 by transmitting a storage access command for reading or writing or other processing in a NAS to the storage system 1.

In response to an input or output request (for example, a write request or a read request) to the volume from the host device, the storage system 1 performs processing, such as data reading or writing, for the storage device 21 corresponding to this volume. Note that hereinafter an input or output request from the host device will be sometimes referred to as an input/output (I/O) request.

The storage system 1, as illustrated in FIG. 1, includes a plurality of (two in the present embodiment) CEs 30-1 and 30-2 and one or more (two in the example illustrated in FIG. 1) DEs 20-1 and 20-2. The DEs 20-1 and 20-2 have similar configurations. Note that hereinafter, as reference numerals denoting the DEs, reference numeral 20-1 or 20-2 will be used when it is desired that one of the plurality of DEs be identified, and reference numeral 20 will be used when an arbitrary DE is referred to.

The DE 20 is capable of containing one or more (four or more in the example illustrated in FIG. 1) storage devices (physical disks) 21 and provides the storage areas (real volumes, real storages) of these storage devices 21 to the storage system 1.

For example, the DE 20 includes slots (not illustrated) at multiple stages, and is able to change the real volume capacity at any time by installing the storage devices 21 in these slots. In addition, redundant arrays of inexpensive disks (RAID) may be configured by using the multiple storage devices 21.

The storage device 21 is a storage device (storage), such as an HDD or a solid state drive (SSD), which has large capacity as compared with a random access memory (RAM) 12 described later and in which various types of data are stored.

The DE 20-1 is coupled to device adapters (DA) 16 of CMs 10-1 and 10-2, and the DE 20-2 is coupled to the DAs 16 of CMs 10-3 and 10-4. Thus, either of the CMs 10-1 and 10-2 is permitted to access the DE 20-1 to write and read data. Likewise, either of the CMs 10-3 and 10-4 is permitted to access the DE 20-2 to write and read data.

That is, the plurality of CMs 10 are each coupled to each storage device 21 of the DE 20, thus achieving redundancy of access paths to the storage device 21.

The CE 30-1 includes one or more (two in the example illustrated in FIG. 1) CMs 10-1 and 10-2, and the CE 30-2 includes one or more (two in the example illustrated in FIG. 1) CMs 10-3 and 10-4. In some cases, the CE 30-1 and the CE 30-2 will also be denoted as CE #0 and CE #1, respectively. Hereinafter, as reference numerals denoting CEs, reference numeral 30-1 or 30-2 will be used when it is desired that one of the plurality of CEs be identified, and reference numeral 30 will be used when an arbitrary CE is referred to.

The CMs 10-1 to 10-4 are control apparatuses (controllers, storage control apparatuses) that control operations inside the storage system 1 and perform various types of control, such as control of data access to the storage device 21 of the DE 20 in accordance with an I/O request transmitted from a host device. In addition, the CMs 10-1 to 10-4 have configurations similar to each other. Hereinafter, as reference numerals denoting CMs, reference numeral 10-1, 10-2, 10-3, or 10-4 will be used when one of the plurality of CMs is identified, and reference numeral 10 will be used when an arbitrary CM is referred to. In addition, the CM 10-1, the CM 10-2, the CM 10-3, and the CM 10-4 will be sometimes denoted as CM #0, CM #1, CM #2, and CM #3, respectively. These numerals #0 to #3 are positional information indicating positions in the storage system 1 and, for example, at the time when a system is built, the numerals are set and given to the CMs 10 in the order in which the CMs 10 are coupled, for the sake of positional management.

Among the plurality of CMs 10 included in the storage system 1, one CM 10 performs various types of control as the CM 10 that is the master (primary), which is the main management apparatus. In addition, among the remaining plurality of CMs 10, one CM 10 functions as the CM 10 that is the second, which is a sub-management apparatus functioning as a proxy of the main management apparatus. Among the plurality of CMs 10, the CMs 10 that are neither the master CM 10 nor the second CM 10 function as slave CMs 10.

Hereinafter, the CM 10 that is the master will be sometimes referred to as a master CM 10 and the CM 10 that is the second will be sometimes referred to as a second CM 10. Furthermore, the CMs 10 that are slaves will be sometimes referred to as slave CMs 10.

Upon a failure of the master CM 10, the second CM 10 serves as a new master CM and takes over the operations of the master CM 10.

In the CE 30-1, the redundancy is achieved by using the CMs 10-1 and 10-2 and, in the CE 30-2, the redundancy is achieved by using the CMs 10-3 and 10-4.

The CMs 10-1 to 10-4 are coupled via CAs 15 to host devices, respectively. The CMs 10-1 to 10-4 receive I/O requests for reading or writing and the like transmitted from the host devices and perform control over the storage devices 21 via the DAs 16 and the like.

In addition, the CMs included in the same CE 30 are communicatively coupled to each other via interfaces 18 and a communication path 181. For example, in the CE 30-1, the CM 10-1 and the CM 10-2 are communicatively coupled via the interfaces 18 and the communication path 181. In addition, in the CE 30-2, the CM 10-3 and the CM 10-4 are communicatively coupled via the interfaces 18 and the communication path 181. The communication path 181 is, for example, a communication bus in compliance with standards such as Peripheral Component Interconnect Express (PCIe), and communication using inter-board transfer is performed.

In addition, the CMs 10 included in different CEs 30 are communicatively coupled to each other via the interfaces 17 and communication cables 171. For example, each of the CM 10-1 and the CM 10-2 in the CE 30-1 is communicatively coupled to each of the CM 10-3 and the CM 10-4 in the CE 30-2 via the interfaces 17 and the communication path 171. The communication path 171 is, for example, a local area network (LAN) cable, and communication is performed in compliance with the standards of Transmission Control Protocol (TCP)/Internet Protocol (IP) or the like.

The communication paths 181 and 171 each function as a management path. Note that the standards of the communication path 181 are not limited to PCIe and the standards of the communication path 171 are not limited to TCP/IP, and the standards of each of the communication paths 171 and 181 may be different communication standards.

The CM 10, as illustrated in FIG. 1, includes the CA 15 and the DA 16 and also includes a central processing unit (CPU) 11, the RAM 12, a nonvolatile memory 13, and an FPGA 14. The CA 15, the DA 16, the CPU 11, the RAM 12, the nonvolatile memory 13, and the FPGA 14 are communicatively coupled to each other, for example, via a PCIe bus.

The CA 15 is an adapter that receives data transmitted from a host device, a management terminal (not illustrated), or the like and transmits data output from the CM 10 to the host device, the management terminal, or the like. That is, the CA 15 controls input and output of data from and to an external device such as a host device.

The CA 15 may be a network adapter communicatively coupled to a host device or the like via a NAS or may be a network adapter communicatively coupled to a host device or the like via a SAN. Note that, in the example illustrated in FIG. 1, each CM 10 includes, but is not limited to, the single CA 15 and may include a plurality of CAs 15.

The DA 16 is an interface for communicative coupling to the DE 20, the storage device 21, and the like. The storage device 21 of the DE 20 is coupled to the DA 16 and, based on an I/O request received from a host device, each CM 10 controls access to the storage device 21.

Each CM 10 writes and reads data to and from the storage devices 21 via the DA 16. In addition, in the non-limiting example illustrated in FIG. 1, the single DA 16 is illustrated for each CM 10 for the sake of convenience. Each CM 10 may include a plurality of DAs 16, and redundant paths to the DE 20 may be provided.

In addition, in the example illustrated in FIG. 1, the CMs 10-1 and 10-2 included in the CE 30-1 are each coupled via the DA 16 to the same DE 20. This permits either of the CMs 10-1 and 10-2 to write and read data to and from the storage devices 21 of the same DE 20.

Likewise, the CMs 10-3 and 10-4 included in the CE 30-2 are each coupled to the same DE 20. This permits either of the CMs 10-3 and 10-4 to write and read data to and from the storage devices 21 of the same DE 20.

The nonvolatile memory 13 is a storage device in which programs that are executed by the CPU 11, various types of data, and the like are stored.

The RAM 12 is a storage device that temporarily stores various types of data and programs and, in addition to storing a control program, includes a cache area and the like. The control program is, for example, a program that is executed by the CPU 11 so as to achieve a storage control function as the CM 10, and is stored in the RAM 12 or the nonvolatile memory 13.

In the cache region, data received from a host device and data to be transmitted to a host device are temporarily stored. Note that, in the RAM 12, various types of log information generated in the storage system 1 including the CMs 10 may be temporarily stored and saved.

The CPU 11 is a processing device that performs various types of control and execute computations. The CPU 11 is, for example, a multi-core processor (multi-core CPU). The CPU 11 achieves various functions as the CM 10 by executing an operating system (OS) and programs stored in the RAM 12, the nonvolatile memory 13, and the like.

For example, the CPU 11 executes a master-CM program module, such that the CM 10 concerned functions as the master CM to achieve management functions such as state monitoring, power supply control, and log functions.

The management functions include, as functions to control each CM 10, control of turning on and off and resetting each CM 10, control of turning on and off an LED, and the like. The management functions also include a function of extracting logs of each CM 10, and the like.

In addition, the CPU 11 executes a second-CM program module, such that the CM 10 concerned functions as the second CM 10. That is, when an abnormality is detected in the master CM 10, the CPU 11 performs switching control or the like for the local CM 10 to serve as a new master CM 10.

In addition, the CPU 11 executes a slave-CM program module, such that the CM 10 concerned functions as a slave CM 10. For example, following an instruction from the master CM 10, the local CM 10 performs, for example, transmission of log information to the master CM 10.

A communication interface 18 is an interface for communication via the communication path 181 with another CM 10 included in the same CE 30.

A communication interface 17 is an interface for communication via the communication path 171 with another CM 10 included in another CE 30.

Communication between the CMs 10 performed via the communication paths 171 and 181 is controlled by the FPGAs 14.

The FPGAs 14, for example, monitor and control communication between the CMs 10.

The FPGA 14 includes a programmable logic component and achieves various functions by using this logic component.

The ROM 150 is coupled to the FPGA 14 and, in the ROM 150, identification information uniquely identifying the CM 10 including this ROM 150 is stored. Hereinafter, the ROM 150 coupled to the FPGA 14 will be sometimes referred to as the ROM 150 subordinate to the FPGA 14.

In the present embodiment, a serial number (S/N) set during manufacture of the CM 10 is used as identification information of the CM 10. The serial number is identification information uniquely set for each CM 10 and, for example, is set during manufacture of the CM 10 in a factory or the like and is recorded on the ROM 150.

The serial number is read by a serial-number exchange unit 141 described later and illustrated in FIG. 2.

The FPGA 14 also includes a memory 145. In the memory 145, the serial numbers of all the CMs 10 included in the storage system 1 are stored.

For example, at the time of first activation of the FPGA 14, the serial-number exchange unit 141 described later reads the serial number of the local CM 10 from the ROM 150 subordinate to the FPGA 14 that activates itself, and stores the read serial number in a predetermined storage area of the memory 145.

Role information created by a local-CM role determination unit 142 described later (FIG. 2) is also stored in the memory 145. Note that details of the role information will be described later.

Figure 2:
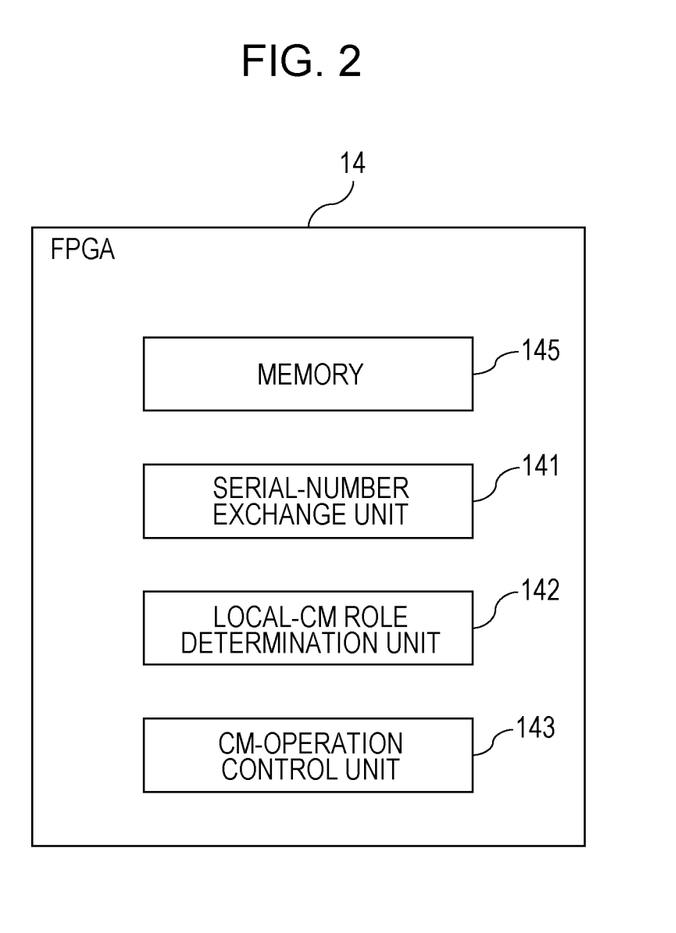
FIG. 2 is a diagram illustrating a functional configuration of an FPGA in a storage control apparatus of a storage system according to an embodiment.

FIG. 2 is a diagram illustrating a functional configuration of the FPGA 14 in the storage control apparatus (control apparatus) 10 in the storage system 1 according to the present embodiment.

The FPGA 14 has, in addition to the functions of monitoring and controlling inter-FPGA communication, functions serving as the serial-number exchange unit 141, the local-CM role determination unit 142, and a CM-operation control unit 143 as illustrated in FIG. 2.

Power is supplied to the FPGA 14 at the time when the CM 10 (the CE 30) with this FPGA 14 mounted therein is coupled via a power supply cable to a power supply source (not illustrated). That is, power (standby power) is supplied to the FPGA 14 even before a power-on button of the CM 10 is pressed, such that the above-mentioned functions serving as the serial-number exchange unit 141, the local-CM role determination unit 142, and the CM-operation control unit 143 may be performed.

In such a manner, the functions serving as the serial-number exchange unit 141, the local-CM role determination unit 142, and the CM-operation control unit 143 are performed before power-on of the CM 10, and thus the time taken to activate the storage system 1 (the CM 10) may be reduced.

Note that the functions serving as the serial-number exchange unit 141, the local-CM role determination unit 142, and the CM-operation control unit 143, for example, may be performed at power-on or reactivation of the CM 10 concerned.

The serial-number exchange unit 141 exchanges serial numbers with the CMs 10 other than the local CM 10 included in the storage system 1.

That is, the serial-number exchange unit 141 notifies all of the other CMs 10 of the serial number of the local CM 10 via inter-FPGA communication. The serial-number exchange unit 141 also receives serial numbers respectively transmitted from the other CMs 10 and stores the received serial numbers as a serial number list in a predetermined storage area of the memory 145.

The serial-number exchange unit 141 also stores the serial number of the local CM 10 read from the ROM 150 in the serial number list of the memory 145. Thereby, the serial numbers of all the CMs 10 included in the storage system 1 are registered in the memory 145 (the serial number list).

The local-CM role determination unit 142 determines the role of the local CM 10. That is, the local-CM role determination unit 142 determines whether the local CM 10 is the master CM 10, the second CM 10, or a slave CM 10.

The local-CM role determination unit 142 determines the role of the local CM 10 by using the serial numbers of all the CMs 10 in the storage system 1 stored in the memory 145.

The local-CM role determination unit 142 converts, into numerical values, the serial numbers of all the CMs 10 in the storage system 1 stored in the memory 145 and determines the role of the local CM 10 based on the position of the serial number value of the local CM 10 in the order of the serial number values of all the CMs 10.

Thus, the local-CM role determination unit 142 creates a sorted serial number list in which the serial numbers of the serial number list in the memory 145 are sorted by value.

Accordingly, the sorted serial number list is a list in which the serial numbers of all the CMs 10 in the storage system 1 are sorted by value.

For example, the local-CM role determination unit 142 creates a sorted serial number list by sorting all the serial numbers (the serial number list) in order from the smallest value to the largest value.

By referencing the sorted serial number list, the local-CM role determination unit 142 determines the local CM 10 to be the master CM 10 if the serial number of the local CM 10 has the smallest value among the serial numbers of all the CMs 10.

In addition, the local-CM role determination unit 142 determines the local CM 10 to be the second CM 10 if the serial number of the local CM 10 has the second smallest value among the serial numbers of all the CMs 10.

When the local CM 10 is neither the master CM 10 nor the second CM 10, the local-CM role determination unit 142 determines the local CM 10 to be a slave CM 10. That is, when the value of the serial number of the local-CM 10 ranks the third or lower among the values of the serial numbers of all the CMs 10, the local-CM role determination unit 142 determines the local CM 10 to be a slave CM 10.

In such a way, the local-CM role determination unit 142 determines the role of the local CM 10 based on the relationship (magnitude relationship) between the serial number of the local CM 10 and the serial number of each of the other CMs 10.

The local-CM role determination unit 142 stores role information, which indicates the determined role of the local CM 10, in a predetermined storage area of the memory 145. For example, the local-CM role determination unit 142 stores "1" upon determining the local CM 10 to be the master CM 10 and stores "2" upon determining the local CM 10 to be the second CM 10, as role information in a predetermined area of the memory 145. In addition, upon determining the local CM 10 to be a slave CM 10, the local-CM role determination unit 142 stores "0" as role information in the predetermined area of the memory 145.

Note that the role information that is stored in the memory 145 is not limited to these cases, and storage of role information may be implemented with various modifications. For example, another value may be stored as role information in the memory 145. In addition, the local-CM role determination unit 142 may set, as role information, a flag corresponding to any of the master CM, the second CM 10, and a slave CM 10 in a predetermined storage area of the memory 145, and setting of role information may be implemented with appropriate changes.

The CM-operation control unit 143 performs control so that the local CM 10 operates as any role of the master CM 10, the second CM 10, and a slave CM 10 in accordance with the role information stored in the memory 145 by the local-CM role determination unit 142.

For example, the CM-operation control unit 143 switches a program module to be executed by the CPU 11, in accordance with the role information stored in the memory 145 by the local-CM role determination unit 142. For example, when the local-CM role determination unit 142 determines the local CM 10 to be the master CM 10, control is performed so that the CPU 11 reads a master-CM program module from the nonvolatile memory 13 or the like to execute the read master-CM program module. In addition, when the local-CM role determination unit 142 determines the local CM 10 to be the second CM 10, control is performed so that the CPU 11 reads the second-CM program module from the nonvolatile memory 13 or the like to execute the read second-CM program module. Furthermore, when the local-CM role determination unit 142 determines the local CM 10 to be a slave CM 10, control is performed so that the CPU 11 reads the slave-CM program module from the nonvolatile memory 13 or the like to execute the read slave-CM program module.

That is, at the time of activation of the CM 10, the CM-operation control unit 143 causes the CPU 11 to execute a program module corresponding to the role information in the memory 145.

(B) Operations

Figure 3:
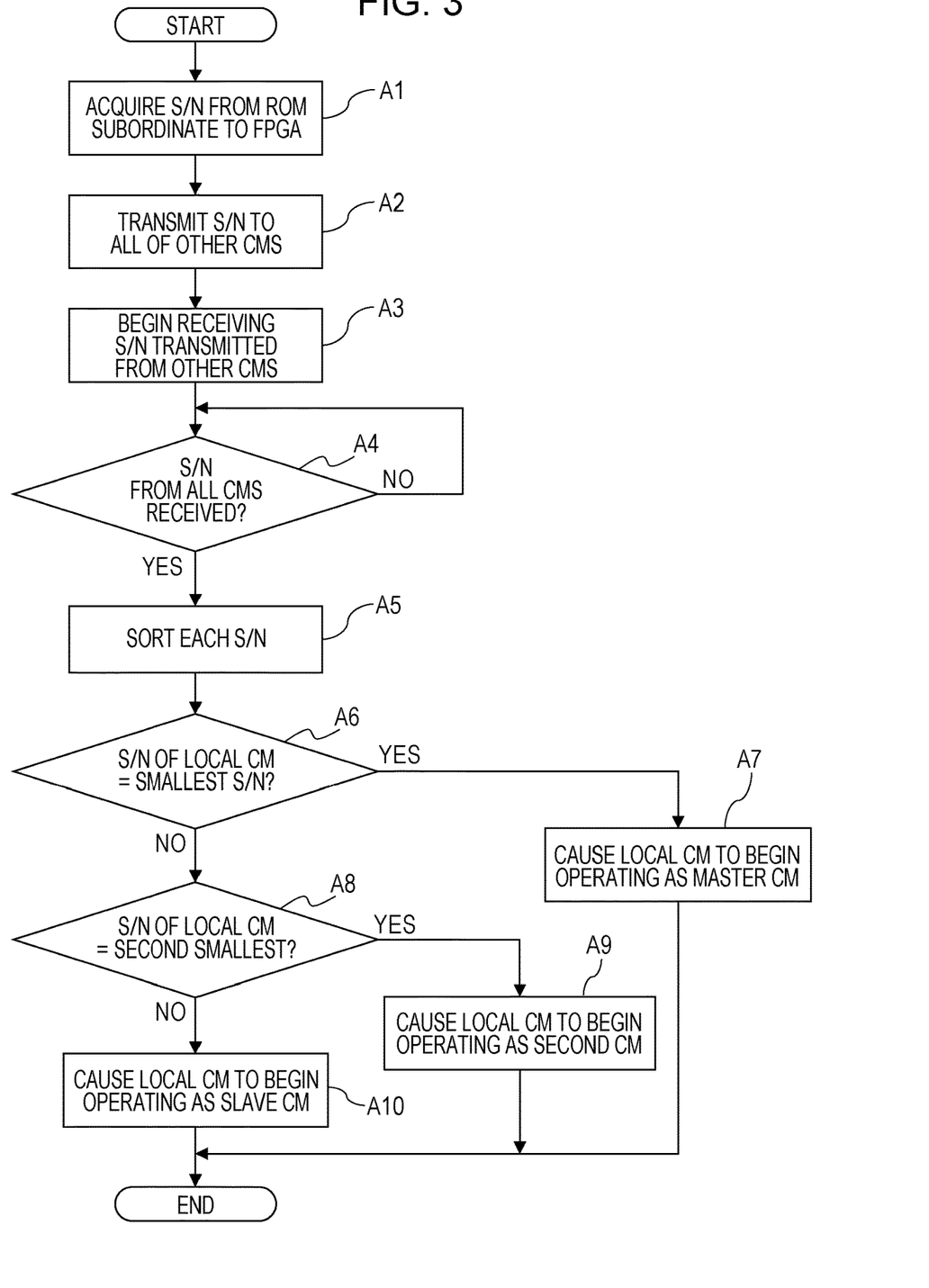
FIG. 3 is a flowchart illustrating a process of an FPGA in a storage system according to an embodiment.

Processing of the FPGA 14 in the storage system 1 according to the present embodiment configured as described above will be described according to a flowchart illustrated in FIG. 3. The process illustrated in FIG. 3 is, for example, performed at the beginning of supply of standby power to the storage system 1, and therefore the process is carried out at a similar timing in each of the CMs 10 included in the storage system 1.

In A1, the serial-number exchange unit 141 acquires the serial number of the local CM 10 from the ROM 150 subordinate to the FPGA 14 of the local CM 10.

In A2, the serial-number exchange unit 141 transmits the serial number of the local CM 10 acquired in A1 to all of the other CMs 10 in the storage system 1.

In A3, the serial-number exchange unit 141 begins receiving serial numbers transmitted from the other CMs 10. The received serial numbers are stored as a serial number list in the memory 145.

Note that, for transmission and reception of serial numbers to and from the other CMs 10 in A1 to A3, inter-FPGA communication via the communication cables 171 and the communication paths 181 is used.

In A4, the serial-number exchange unit 141 verifies whether serial numbers have been received from all of the other CMs 10. If serial numbers have not been received from all of the other CMs 10 (NO in A4), A4 is repeated.

If serial numbers have been received from all of the other CMs 10 (YES in A4), the process proceeds to A5.

In A5, the local-CM role determination unit 142 sorts the serial numbers of all the CMs 10 in the storage system 1 by value to create a sorted serial number list. For example, the local-CM role determination unit 142 sorts all of the serial numbers in order from the smallest value to the largest value.

In A6, the local-CM role determination unit 142 verifies whether the serial number of the local CM 10 has the smallest value. That is, it is verified whether the serial number of the local CM 10 is equal to the smallest serial number.

If, as a result of verification, the serial number of the local CM 10 has the smallest value (YES in A6), then, in A7, the local-CM role determination unit 142 determines the local CM 10 to be the master CM 10.

The CM-operation control unit 143 performs control to cause the local CM 10 to operate as the master CM 10. For example, upon power-on of the CMs 10, the CM-operation control unit 143 causes the local CM to begin operating as the master CM 10 by causing the CPU 11 of the local CM 10 to execute the master-CM program module. Thereafter, the process terminates.

If, as a result of verification in A6, the serial number of the local CM 10 does not have the smallest value (NO in A6), the process proceeds to A8.

In A8, the local-CM role determination unit 142 verifies whether the serial number of the local CM 10 has the second smallest value. That is, it is verified whether the serial number of the local CM 10 is equal to the second smallest serial number.

If, as a result of verification, the serial number of the local CM 10 has the second smallest value (YES in A8), then, in A9, the local-CM role determination unit 142 determines the local CM 10 to be the second CM 10.

The CM-operation control unit 143 performs control to cause the local CM 10 to operate as the second CM 10. For example, upon power-on of the CM 10, the CM-operation control unit 143 causes the local CM 10 to begin operating as the second CM 10 by causing the CPU 11 of the local CM to execute the second-CM program module. Thereafter, the process terminates.

If, as a result of verification in A8, the serial number of the local CM 10 does not have the second smallest value (NO in A8), the process proceeds to A10.

In A10, the local-CM role determination unit 142 determines that the local CM 10 is a slave CM 10.

The CM-operation control unit 143 performs control to cause the local CM 10 to operate as a slave CM 10. For example, upon power-on of the CM 10, the CM-operation control unit 143 causes the local CM 10 to begin operating as a slave CM 10 by causing the CPU 11 of the local CM 10 to execute the slave-CM program module. Thereafter, the process terminates.

Next, processing performed upon occurrence of a failure of the master CM 10 in the storage system 1 according to an embodiment will be described according to a flowchart illustrated in FIG. 4.

Figure 4:
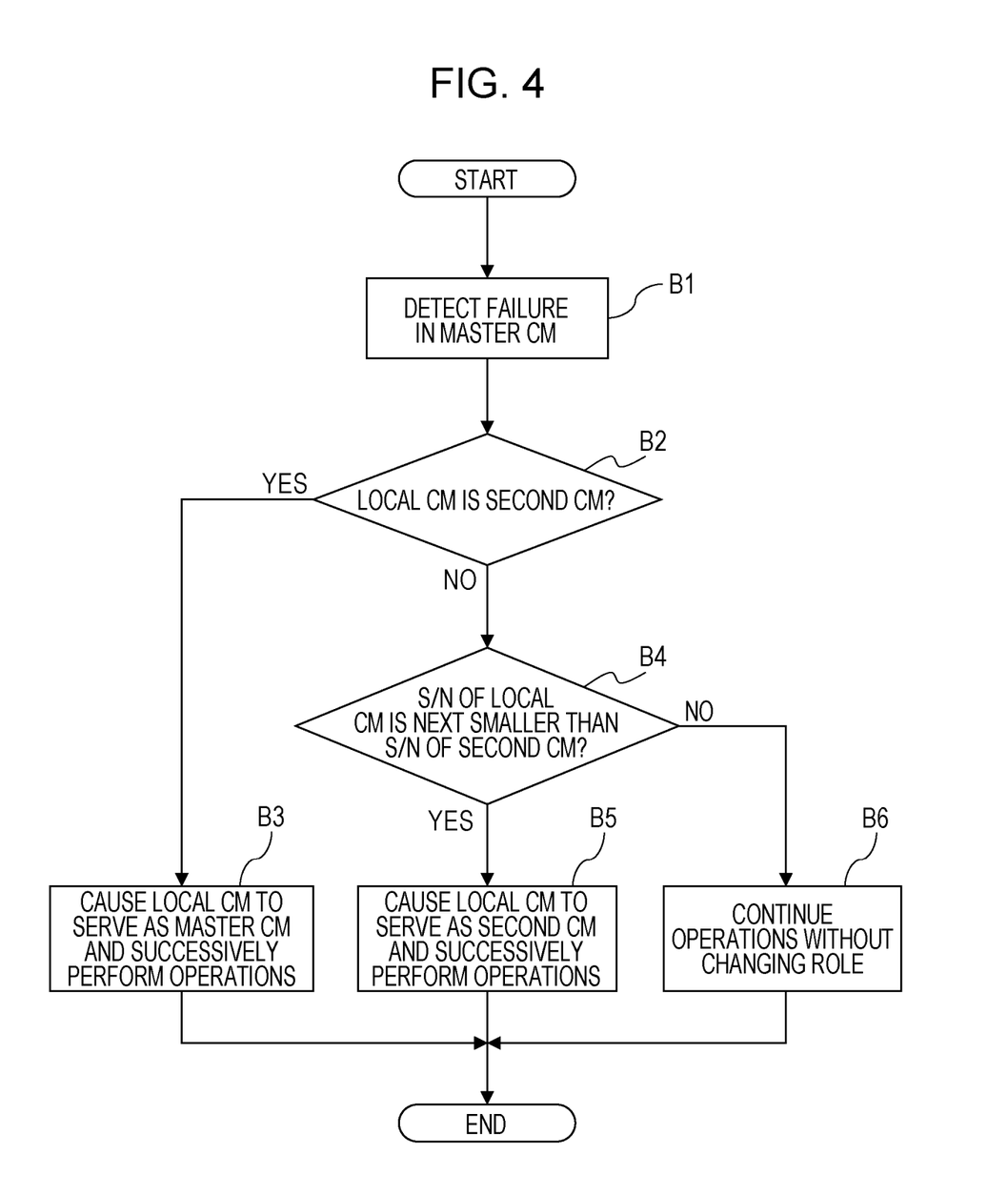
FIG. 4 is a flowchart illustrating a process upon occurrence of a failure of a master CM in a storage system according to an embodiment.

The process illustrated in FIG. 4 is performed in the CM 10 notified of detection of a failure in the master CM 10 and therefore is carried out at a similar timing in each of the CMs 10 included in the storage system 1.

In B1, some fault has occurred and a failure is detected in the master CM 10. Notification that a failure has been detected in the master CM 10 is, for example, transmitted to each CM 10 by inter-FPGA communication. Note that notification of failure detection between the CMs 10 may be implemented by various known methods, and a detailed description thereof is omitted.

In B2, in the CM 10 notified of detection of a failure in the master CM 10, by referencing the role information in the memory 145, the local-CM role determination unit 142 confirms whether the local CM 10 is the second CM 10.

If the local CM 10 is the second CM 10 (YES in B2), the process proceeds to B3.

In B3, the CM-operation control unit 143 performs control so that the CPU 11 reads the master-CM program module from the nonvolatile memory 13 or the like to execute the read master-CM program module. Thereby, the local CM 10 concerned serves as a new master CM 10 and successively performs operations of the master CM 10. The CM-operation control unit 143, for example, may reactivate the local CM 10 and, at the time of this reactivation, may cause the CPU 11 to execute the master-CM program module. In addition, the local-CM role determination unit 142 changes the role information in the memory 145 to a value indicating the master CM 10. Thereafter, the process terminates.

If the local CM 10 is not the second CM 10 (NO in B2), the process proceeds to B4.

In B4, by referencing the sorted serial number list, the local-CM role determination unit 142 confirms whether the value of the serial number of the local CM 10 is next smaller than the value of the serial number of the second CM 10.

If, as a result of confirmation, the value of the serial number of the local CM 10 is next smaller than the value of the serial number of the second CM 10 (YES in B4), the process proceeds to B5.

In B5, the CM-operation control unit 143 performs control so that the CPU 11 reads the second-CM program module from the nonvolatile memory 13 or the like to execute the read second CM program module. Thereby, the CM 10 concerned serves as a new second CM 10 and successively performs operations of the second CM 10. The CM-operation control unit 143, for example, may reactivate the local CM 10 and, at the time of this reactivation, may cause the CPU 11 to execute the second-CM program module. In addition, the local-CM role determination unit 142 changes the role information in the memory 145 to a value indicating the second CM 10. Thereafter, the process terminates.

If, as a result of confirmation in B4, the value of the serial number of the local CM 10 is not next smaller than the value of the serial number of the second CM 10 (NO in B4), the process proceeds to B6.

In B6, the CM 10 concerned is not subjected to changes in operations and continues to perform operations as the slave CM 10. That is, the CM-operation control unit 143 does not change the role of the local CM 10. Thereafter, the process terminates.

Next, processing of the FPGA 14 during maintenance and replacement of the CM 10 in the storage system 1 according to an embodiment will be described according to a flowchart illustrated in FIG. 5.

Figure 5:
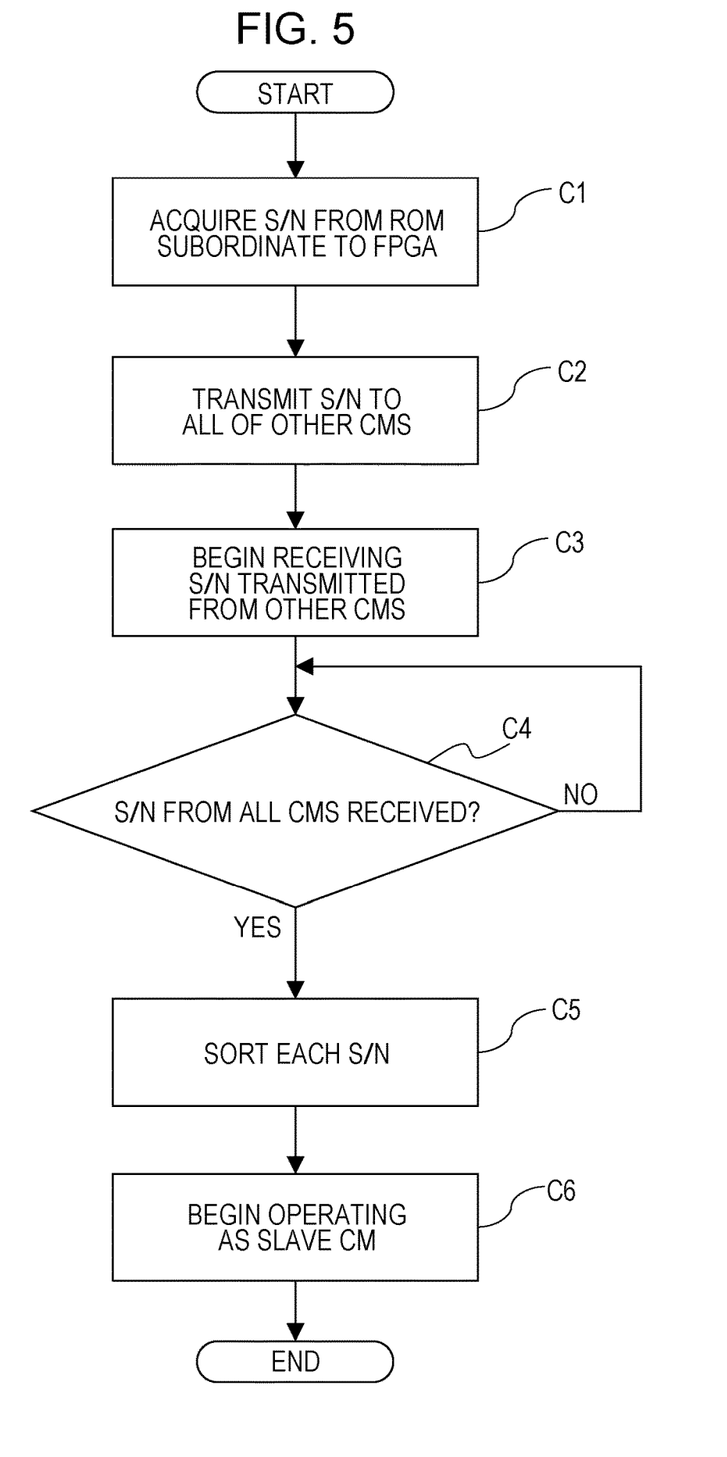
FIG. 5 is a flowchart illustrating a process of an FPGA during maintenance and replacement of a CM in a storage system according to an embodiment.

The process illustrated in FIG. 5 is performed in the FPGA 14 of the CM (post-replacement CM) 10 newly mounted in the storage system 1 by maintenance and replacement.

In C1, the serial-number exchange unit 141 acquires the serial number of the local CM 10 from the ROM 150 subordinate to the FPGA 14 of the local CM 10.

In C2, the serial-number exchange unit 141 transmits the serial number of the local CM 10 acquired in C1 to all of the other CMs 10 in the storage system 1.

In the case where the CM 10 is replaced by maintenance work such that a new CM 10 is mounted, when the newly mounted CM 10 (hereinafter sometimes referred to as a post-replacement CM 10) transmits the serial number to the master CM 10, a signal indicating that the CM 10 has been newly mounted is sent.

When transmitting the serial number of the post-replacement CM 10 to the other CMs 10, the post-replacement CM 10 may transmit, together with the serial number, a signal indicating that the post-replacement CM 10 has been newly mounted. This allows the CMs 10 other than the master CM 10 to be aware that the post-replacement CM 10 is a newly mounted CM.

In the storage system 1, each CM 10 that has received the serial number, together with the signal indicating that the post-replacement CM 10 has been newly mounted, transmits its own serial number to the post-replacement CM 10.

Note that the serial-number exchange unit 141 of the post-replacement CM 10 may request all of the other CMs 10 to transmit the serial number of each CM 10.

In C3, the serial-number exchange unit 141 begins receiving the serial numbers transmitted from the other CMs 10. The received serial numbers are stored as a serial number list in the memory 145.

Note that inter-FPGA communication via the communication cables 171 and the communication paths 181 is used for transmission and reception of serial numbers to and from the other CMs 10 in C1 to C3.

In C4, the serial-number exchange unit 141 verifies whether serial numbers have been received from all of the other CMs 10. For example, in the post-replacement CM 10, the maximum number of (for example, four) CMs 10 that are mounted in the storage system 1 is registered in advance. By comparing the number of received serial numbers with the maximum number of mounted CMs 10, the serial-number exchange unit 141 is able to verify whether serial numbers have been received from all of the other CMs 10. If serial numbers have not been received from all of the other CMs 10 (NO in C4), C4 is repeated.

If serial numbers have been received from all of the other CMs 10 (YES in C4), the process proceeds to C5. In consideration of the case where some fault has occurred in some of the other CMs 10, even when the number of received serial numbers is less than the maximum number of mounted CMs, the process may proceed to C5 if a predetermined time has elapsed.

In C5, the local-CM role determination unit 142 sorts the serial numbers of all the CMs 10 of the storage system 1 by value to create a sorted serial number list. For example, the local-CM role determination unit 142 sorts all the serial numbers in order from the smallest value to the largest value.

In C6, the CM-operation control unit 143 performs control to cause the local CM 10 to operate as a slave CM 10. When the maintenance and replacement of the CM 10 is performed in the storage system 1, it is desirable that the post-replacement CM 10 initially function as a slave CM 10, regardless of whether the serial number thereof is large or small. Thereby, the roles of the other CMs 10 that are already in operation in the storage system 1 will not be changed, which may reduce the effect on the existing CMs 10 and may maintain the stability of the system.

For example, the CM-operation control unit 143 causes the local CM 10 to begin operating as a slave CM 10 by causing the CPU 11 of the local CM 10 to execute the slave-CM program module. Thereafter, the process terminates. The process illustrated in FIG. 5 may be performed on an additional CM 10 when the additional CM 10 is newly added to the storage system 1.

(C) Effects

In such a way, according to the storage system 1 as an embodiment of the present disclosure, in each CM 10, the local-CM role determination unit 142 determines the role of the local CM 10 (the master CM, the second CM, or a slave CM) by comparing the serial number of the local CM 10 with the serial numbers of the other CMs. Thereby, without inclusion of a dedicated management apparatus or the like, such as an SVC, in each CM 10, the local-CM role determination unit 142 is able to autonomously determine the role of the local CM 10. This may reduce the manufacturing cost of the system. In addition, on this occasion, the local-CM role determination unit 142 may easily determine the role of the local-CM 10 and, for example, may easily determine the master CM 10.

In addition, the local-CM role determination unit 142 may easily perform a comparison between serial numbers by referencing the sorted serial number list and may efficiently determine the role of the local CM 10.

Furthermore, the local-CM role determination unit 142 records the determined role as role information in the memory 145. If a failure is detected in the master CM 10, in each CM 10, the local-CM role determination unit 142 confirms the role information, and if the local CM 10 is the second CM 10, the CM-operation control unit 143 performs control for the local CM 10 to function as the master CM 10. Thereby, without inclusion of a dedicated management apparatus or the like, such as an SVC, if a failure is detected in the master CM 10, the second CM 10 is able to be quickly switched to the master CM 10. This may improve reliability.

The FPGA 14 performs functions as the serial-number exchange unit 141, the local-CM role determination unit 142, and the CM-operation control unit 143 by power supplied as standby power before the power-on button of the CM 10 is pressed, and thereby the time taken to activate the storage system 1 (the CM 10) may be reduced.

(D) Others

The disclosed techniques are not limited to the foregoing embodiment and may be implemented with various modifications without departing from the spirit and scope of the present embodiment. Each configuration and each process in the present embodiment may be suitably selected if desired or may be used in combination as appropriate.

For example, in the foregoing embodiment, the local-CM role determination unit 142 determines the local CM 10 to be the master CM 10 when the serial number of the local CM 10 has the smallest value among the serial numbers of all the CMs 10, and determines the local CM 10 to be the second CM 10 when the serial number of the local CM 10 has the second smallest value. However, the techniques are not limited to this and may be implemented with various modifications.

For example, the local-CM role determination unit 142 may determine the local CM 10 to be the master CM 10 when the serial number of the local CM 10 has the largest value among the serial numbers of all the CMs 10, and may determine the local CM 10 to be the second CM 10 when the serial number of the local CM 10 has the second largest value. In addition, the CM 10 whose serial number has a value closest to a predetermined reference value may be determined to be the master CM 10, and the local CM 10 whose serial number has a value the second closest to the predetermined reference value may be determined to be the second CM 10.

In addition, in the foregoing embodiment, the non-limiting example in which two CEs 30 are included and therefore four CMs 10 in total are mounted in the storage system 1 has been described. In the storage system 1 without inclusion of an SVC, although the number of CMs 10 is desirably about four, for example, three or less or five or more CMs 10 may be mounted. The configuration of the storage system 1 may be implemented with various modifications.

In addition, the present embodiment may be implemented and manufactured by a person skilled in the art according to the foregoing disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system comprising:
a plurality of control apparatuses communicably coupled to each other,
a first control apparatus of the plurality of control apparatuses including:
a first memory configured to store first instructions; and
a first processor configured to operate using standby power, before a power-on selection is made, and execute the first instructions causing a process including:
collecting first identification information of each of the plurality of control apparatuses other than the first control apparatus;
storing the first identification information in the first memory;
determining a role of the first control apparatus based on a comparison result derived by comparing second identification information of the first control apparatus with the first identification information, the first identification information and the second identification information are numerical values, and
determining the role of the first control apparatus based on a magnitude relationship between a value of the second identification information and a value of the first identification information.

2. The information processing system according to claim 1, wherein the first and second identification information is a serial number that is set for each of the plurality of control apparatuses during manufacture of the control apparatuses.

3. The information processing system according to claim 1, wherein the process further includes:
storing first role information in the first memory, the first role information indicating the role of the first control apparatus.

4. The information processing system according to claim 3, wherein the process further includes:
changing the first role information stored in the first memory to indicate a first role when the first role information indicates a second role and when an abnormality is detected in a second control apparatus of the plurality of control apparatuses, the first role being a role of serving as a main management apparatus, the second role being a role of serving as a sub-management apparatus that is a proxy of the main management apparatus, the second control apparatus having second role information indicating the first role.

5. The information processing system according to claim 1, wherein the role includes a first role of serving as a main management apparatus that manages the information processing system, a second role of serving as a sub-management apparatus that functions as a proxy of the main management apparatus when an abnormality is detected in the main management apparatus, and a third role of serving as a managed apparatus which is neither the main management apparatus nor the sub-management apparatus, and the information processing system further comprises a newly mounted second control apparatus including:

a second memory configured to store second instructions; and a second processor configured to operate using standby power, before a power-on selection is made, and execute the second instructions causing a process including:

transmitting third identification information of the second control apparatus to each of the plurality of control apparatuses;

collecting the first and second identification information;

storing the first and second identification information in the second memory; and storing role information in the second memory, the role information indicating the third role.

6. A control apparatus comprising:

a memory configured to store instructions; and a processor, coupled to the memory, configured to operate using standby power, before a power-on selection is made, and execute the instructions causing a process including:

collecting first identification information of a plurality of apparatuses and second identification information of the control apparatus;

storing the first identification information in the memory;

sorting the first identification information and the second identification information according to a hierarchy;

determining whether the second identification information is at a bottom position or next to bottom position of the hierarchy;

causing the control apparatus to operate as a master apparatus when a determination is made that the second identification information is at the bottom position;

causing the control apparatus to operate as a second apparatus when a determination is made that the second identification information is at the next to bottom position;

causing the control apparatus to operate as a slave apparatus when a determination is made that the second identification information is not at the bottom position or the next to bottom position, the first identification information and the second identification information are numerical values, and determining the role of the control apparatus based on a magnitude relationship between a value of the second identification information and a value of the first identification information.

7. The control apparatus according to claim 6, wherein the first and second identification information is a serial number.

8. The control apparatus according to claim 6, wherein the hierarchy is listed from largest serial number to smallest serial number.

9. The control apparatus according to claim 6, wherein the process further includes: causing the control apparatus operating as the second apparatus to operate as the master apparatus when an abnormality is detected in a first apparatus operating as the master apparatus.

10. A non-transitory computer-readable recording medium having stored therein a program that causes a processor to execute a process, the processor being configured to operate using standby power, before a power-on selection is made, the process comprising:

collecting first identification information of each of a plurality of apparatuses communicably coupled to a control apparatus including the processor;

storing the first identification information in a first memory of the control apparatus;

determining a role of the control apparatus based on a comparison result derived by comparing second identification information of the control apparatus with the first identification information, the first identification information and the second identification information are numerical values, and determining the role of the control apparatus based on a magnitude relationship between a value of the second identification information and a value of the first identification information.

11. The non-transitory computer-readable recording medium according to claim 10, wherein the identification information is a serial number that is set for each of the control apparatus and the plurality of apparatuses during manufacture of the control apparatus and the plurality of apparatuses.

12. The non-transitory computer-readable recording medium according to claim 10, the process further comprising storing first role information in the first memory, the first role information indicating the role of the control apparatus.

13. The non-transitory computer-readable recording medium according to claim 12, the process further comprising changing the first role information stored in the first memory to indicate a first role when the first role information indicates a second role and when an abnormality is detected in a first apparatus of the plurality of apparatuses, the first role being a role of serving as a main management apparatus, the second role being a role of serving as a sub-management apparatus that is a proxy of the main management apparatus, the first apparatus having second role information indicating the first role.

* * * * *